United States Patent [19]

Iida et al.

[11] 4,041,916
[45] Aug. 16, 1977

[54] INTERNAL COMBUSTION ENGINE AND METHOD OF OPERATING SAME

[75] Inventors: Hiroshi Iida, Tokyo; Kenichi Sasaki, Yokohama, both of Japan

[73] Assignee: Nissan Motor Company, Limited, Yokohama, Japan

[21] Appl. No.: 676,663

[22] Filed: Apr. 14, 1976

[30] Foreign Application Priority Data

Apr. 15, 1975 Japan .................................. 50-45553

[51] Int. Cl.² ............................................. F02M 25/06
[52] U.S. Cl. .................................... 123/119 A; 60/282
[58] Field of Search ............. 123/119 A, 75 B, 32 ST, 123/127 R; 60/274, 278, 279, 282

[56] References Cited

U.S. PATENT DOCUMENTS

| 3,809,039 | 5/1974 | Alquist | 123/119 A |
| 3,885,540 | 5/1975 | Stadler | 123/119 A |
| 3,941,105 | 3/1976 | Yagi et al. | 123/119 A |

FOREIGN PATENT DOCUMENTS

| 2,408,622 | 2/1974 | Germany | 123/119 A |

*Primary Examiner*—Wendell E. Burns

[57] ABSTRACT

A combustion system and a method for operating same by passing a fuel-air mixture into an auxiliary combustion chamber and the same fuel-air mixture into a main combustion chamber with a portion of recirculated exhaust gas.

20 Claims, 4 Drawing Figures

INTERNAL COMBUSTION ENGINE AND METHOD OF OPERATING SAME

The present invention relates to an internal combustion engine having an auxiliary combustion chamber connected to a main combustion chamber by a torch flame passage and means for igniting a fuel-air mixture in the auxiliary combustion chamber and a method of operating same.

The internal combustion engine is operated by passing a first fuel-air mixture into an auxiliary combustion chamber and a second leaner fuel-air mixture into a main combustion chamber, and igniting the first mixture in the auxiliary combustion chamber for igniting the second leaner fuel-air mixture in the main combustion chamber. Each of the auxiliary and main combustion chambers has a separate carburetor. A first carburetor for the auxiliary combustion chamber discharges the first fuel-air mixture that has an air fuel ratio (A/F ratio), by weight, in the range of about 4:1 to about 8:1, and a second carburetor for the main combustion chamber discharges the second fuel-air mixture that has an air fuel ratio (A/F ratio), by weight, in the range of about 18:1 to about 22:1. Because two separate carburetors supply the first fuel-air mixture and second fuel-air mixture, there are many technical difficulty in increasing productivity of the engines and in reducing cost.

A main object of the present invention is to provide a method for operating a spark ignition internal combustion engine having an auxiliary combustion chamber connected to a main combustion chamber by a torch flame passage and means for igniting a fuel-air mixture in the auxiliary combustion chamber, which causes a decrease in $NO_x$ emissions in the exhaust gas discharged from the engine with the minimum losses in fuel economy and drivability.

Another object of the present invention is to provide a method for operating a spark ignition internal combustion engine having an auxiliary combustion chamber connected to a main combustion chamber by a torch flame passage and means for igniting a fuel-air mixture in the auxiliary combustion chamber, which causes a decrease in $NO_x$ emissions, a decrease in HC emissions and a decrease in CO emission in the exhaust gas discharged from the engine with the minimum losses in fuel economy and drivability.

Still another object of the present invention is to provide a combustion system in which a spark ignition internal combustion engine having an auxiliary combustion chamber connected to a main combustion chamber operates on a fuel-air mixture.

A specific object of the present invention is to provide a combustion system in which the engine is fed by one carburetor.

Another specific object of the present invention is to provide a combustion system, of the above character, which operates with low pollution emissions while maintaining high power output and efficiency of the engine.

Still another object of the present invention is to provide a combustion system, of the above character, which is simple in construction and arrangement and less expensive than the prior art combustion system in which two separate carburetors discharge two rich and lean mixtures to the engine.

Other objects, features and advantages of the present invention will become apparent from the following description in connection with the accompanying drawings, in which.

Figure 1:
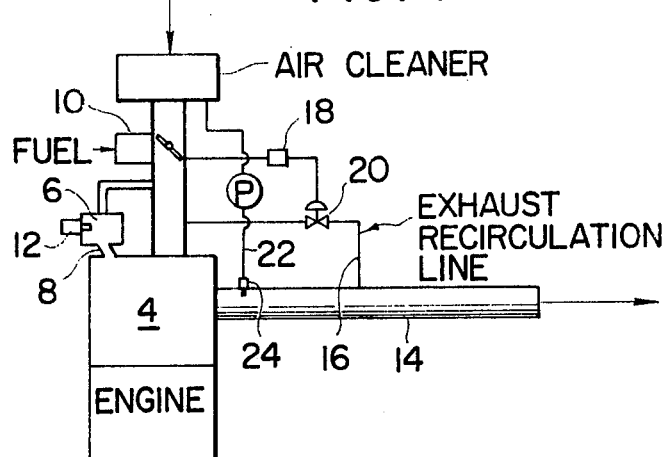
FIG. 1 is a diagrammatic view of a combustion system according to the present invention.

Referring to FIG. 1, a spark ignition internal combustion engine 2 has a main combustion chamber 4 and an auxiliary combustion chamber 6 that is connected to the main combustion chamber by a torch flame passage 8. For simplicity, reference will be made to the main and auxiliary combustion chambers in the singular. It should be understood, however, that the engine can actually have four main combustion chambers, with each main combustion chamber having an auxiliary combustion chamber with the associated elements as set forth with reference to the singular chambers.

The main and auxiliary combustion chambers 4 and 6 has one carburetor 10 connected in fluid communication therewith which in turn is connected to an air supply, a fuel supply and a throttle for controllably discharging a fuel-air mixture from the carburetor 10 into the main and auxiliary combustion chambers 4 and 6.

The carburetor 10 is constructed to receive and mix fuel and air therein and discharge a fuel-air mixture into the main and auxiliary combustion chambers 4 and 6, air fuel ratio (A/F ratio), by weight, of the fuel-air mixture being about the stoichiometry during operation of the engine 2 under about full load and being from about 12:1 to about 16:1 during operation of the engine under low and intermediate loads.

A spark ignition system, only spark plug of which is shown and referred to by numeral 12, is associated with the auxiliary combustion chamber 6 for igniting the fuel-air mixture therein, which in turn ignites the fuel-air mixture in the main combustion chamber 4 for operating the engine 2.

An exhaust conduit 14 is connected to the exhaust outlet of the main combustion chamber 4 for directing the exhaust gas resulting from combustion of the fuel-air mixtures in the main and auxiliary combustion chambers 4 and 6.

An exhaust gas recirculating conduit 16 is connected in fluid communication with the main combustion chamber 4 and the exhaust conduit 14.

A measuring means, such as a pressure controller 18, is associated with the engine 2 for measuring a variable representative of the load imposed on the engine 2 and delivering a signal representative thereof. For example, the measuring means can measure the intake manifold pressure of the main combustion chamber 4 as shown in FIG. 1.

A control means, such as a control valve 20 for example, is positioned in the exhaust gas recirculating conduit 16 and is connected to the measuring means 18 for receiving a signal therefrom and opening and closing the valve in response to the signal. The valve 20 is constructed to be in closed position in response to a signal representative of operation of the engine under about full load. The valve 20 is open and controllably positioned in response to a signal from the measuring means 18 representative of operation of the engine under low and intermediate loads with the opening of the valve 20 and passing exhaust gas in the range of about 10 to about 25 percent of the total exhaust gas passing through the conduit 14.

Figure 3:
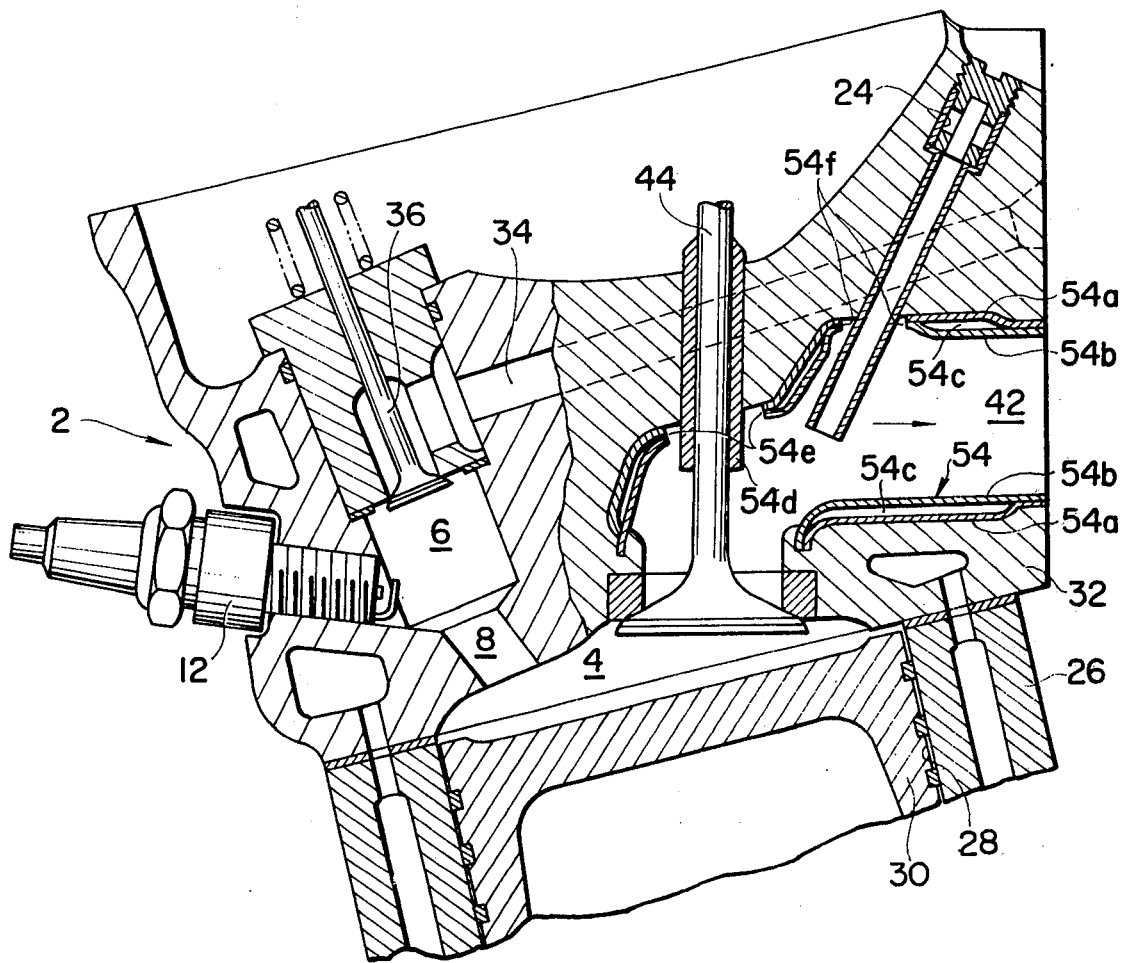
FIG. 3 is an enlarged fregmentary sectional view, taken through line III—III of FIG. 2 showing arrangement of auxiliary and main combustion chambers and a secondary air injector.

The engine 2 has the following characteristics:

Proper combustion is achieved when the volume of the auxiliary combustion chamber 6 is from 6 to 15 percent of the total clearance volume that is the combined volume including a volume of the auxiliary combustion chamber 6, a volume of the main combustion chamber 4 at the top dead center position of a piston and a volume of the torch flame passage 8, see the position illustrated in FIG. 3. The cross sectional area of the torch flame passage 8 is from 0.07 to 0.3 square centimeter for each cubic centimeter of volume of the auxiliary combustion chamber 6.

An additional or secondary air supply conduit 22 has one end connected the discharge side of the air cleaner to receive air therein and other end leading to an air injection nozzle 24 for injecting an additional air into the exhaust conduit 14 for mixing the additional air with the exhaust gas passing through the exhaust conduit 14.

The construction and arrangement of the elements of the combustion system will now be described in detail with reference to FIGS. 2 through 4.

Figure 2:
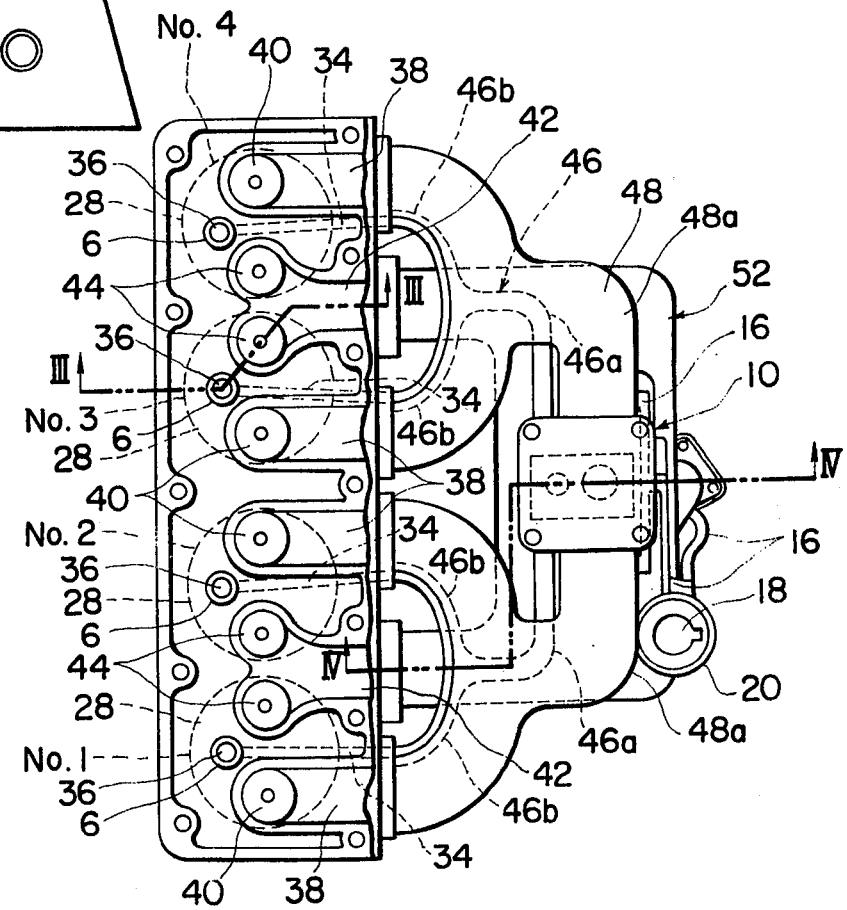
FIG. 2 is a top view showing arrangement of elements of the combustion system.

As best seen in FIG. 2, the enging 2 is a four-cylinder internal combustion engine and comprises a cylinder block 26 (see FIG. 3) which is provided with cylinders 28 reciprocably slidable within which are pistons 30 connected to a crank shaft (not shown). Provided above each piston 30 is the main combustion chamber 4 (see FIG. 3). Formed in a cylinder head 32 that is secured on the cylinder block 26 by means of a number of bolts (see FIG. 2) are the auxiliary combustion chambers 6, each being connected to one main combustion chamber 4 by way of one torch flame passage 8. The cylinder head 32 is provided with transversely extending auxiliary intake passageways 34, each communicating with each auxiliary combustion chamber 6 through an auxiliary intake valve 36. Also provided in the cylinder head 32 are transversely extending main intake passageways 38 (see FIG. 2), each communicating with each main combustion chamber 4 through a main intake valve 40, and exhaust passageways or exhaust ports 42, each extending downwardly and inwardly to the regions of two exhaust valves 44 of cylinders having cylinder numbers 1 and 2 or of cylinders having cylinder numbers 3 and 4 (see FIG. 2) to connect with the main combustion chambers 4. Each auxiliary combustion chamber 6 has a spark plug 12 whose electrode projects into the auxiliary combustion chamber to ignite a fuel-air mixture therein.

The main combustion chambers 4 are connected in fluid communication with the carburetor 10 (see FIGS. 2 and 4) by means of an auxiliary intake manifold 46 and the auxiliary combustion chamber are connected in fluid communication with the same carburetor 10 by means of a main intake manifold 48. As best seen in FIG. 4, the auxiliary and main intake manifolds has the common heat riser 50 to which the carburetor 10 having primary and secondary barrels 10a and 10b is attached to discharge a fuel-air mixture into the heat riser 50. To pass or distribute the fuel-air mixture into all the auxiliary combustion chambers 6, two manifold passages 46a extend outwardly from the heat riser 50, each manifold passage 46a splitting into two branch passages 46b to meet auxiliary intake passageways 34 (see FIG. 2). To pass or distribute the fuel-air mixture into all the main combustion chambers 4, two manifold passages 48a extend outwardly from the heat riser 50, each manifold passage 48a splitting into two branch passages 48b to meet main intake passageways 38 (see FIG. 2). It is to be noted that two manifold passages 46a and their branch passages 46b form the auxiliary intake manifold 46, while two manifold passages 48a and their branch passages 48b form the main intake manifold 48.

As described before, air fuel ratio (A/F ratio), by weight, of the fuel-air mixture discharged by the carburetor 10 is about stoichiometry during operation of the engine 2 under about full load and is from about 12:1 to about 16:1 during operation of the engine 2 under low and intermediate loads.

The exhaust recirculation conduit 16, with its inlet end 16a inserted into exhaust conduit 14 (see FIG. 4), extends to a portion adjacent to the heat riser 50 and then splits into two branch conduits (see FIG. 2), each connecting with the manifold passages 48a to recirculate a portion of exhaust gas into the manifold passages 48a to dilute the fuel-air mixture discharged from the carburetor and passed into the main combustion chambers 4. The EGR control valve 20 is arranged as illustrated in FIG. 2. The valve 20 has a diaphragm which urges a normally closed valve against the bias of a spring toward an open position in response to a vacuum imposed on a chamber on one side of the diaphragm. The vacuum to the control valve 20 is controlled by the measuring means 18 and may take an intake manifold vacuum alone or an intake manifold vacuum bleeded in accordance with pressure of the exhaust gas. The control valve 20 and measuring means 18 are constructed to permit 0 %EGR during operation of the engine under full load and 10–25 %EGR during operation of the engine under low and intermediate loads.

The exhaust gas resulted from the combustion is directed by the exhaust port 42 (see FIG. 3), an exhaust manifold 52 (see FIG. 4) and an exhaust pipe (not shown) to the atmosphere, the exhaust port 42, exhaust manifold 52 and exhaust pipe forming the exhaust conduit 14. The exhaust gas is illustrated in a plurality of solid arrows in FIGS. 3 and 4.

A dual-walled port liner 54 is provided in the exhaust port 42 by casting. The dual-walled port liner 42 has an outer metal layer 54a, an inner metal layer 54b and an air layer 54c between the outer and inner metal layers 54a and 54b. Since the exhaust port 42 is a Siamese port, the port liner 54 has two apertures for stems of the two exhaust valves 40, only one being shown in FIG. 3 at 54d. Edge of each of the aperture 54d is closed as at 54e. The port liner 54, for permitting the insertion of the air injection nozzle 24, has an aperture whose edge is closed at 54f (see FIG. 3). The edges of the apertures are closed to prevent the entry of sand during casting operation.

Figure 4:
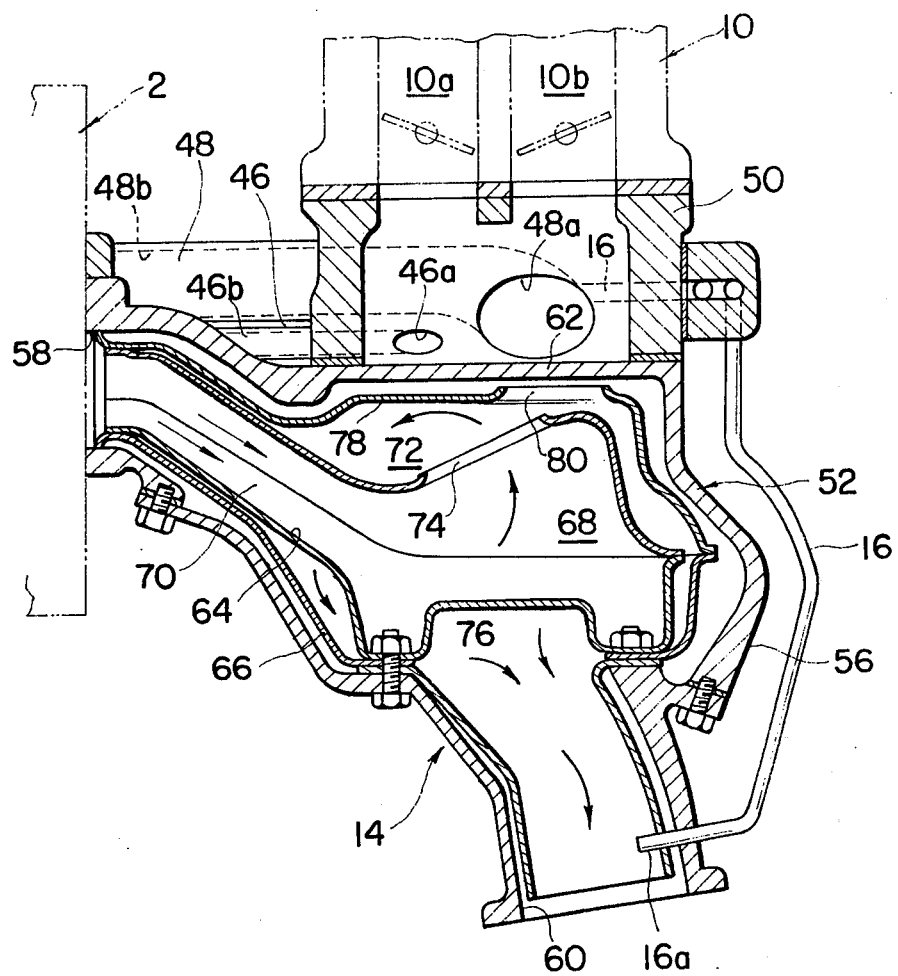
FIG. 4 is a sectional view taken through IV—IV of FIG. 2 showing arrangement of carburetor, main and auxiliary intake manifolds, exhaust manifold and exhaust gas recirculation line.

Referring to FIG. 4, the exhaust manifold 52 has a casing 56 having a plurality of inlet ports 58, each being connected to at least one of the cylinders of the engine 2 and an outlet port 60. The casing 56 and the intake manifold 10 have a common wall 62 which forms the bottom of the heat riser 50. Mounted within the casing 56 are inner and outer liners 64 and 66. The inner liner 64 has a reaction chamber 68 and a plurality of passages 70, corresponding in number to the plurality of inlet ports 58, extending outwardly from the reaction chamber 68 toward the inlet ports 58 to receive the exhaust gas. The inner liner 64 is jacketed by the outer liner 66. The outer liner 66 is spaced from inner liner 64 to form around the reaction chamber 68 a fluid jacket chamber 72 which is in communication with the reaction chamber 68 through a discharge port 74 and with the outlet port 60 through an aperture 76. The outer liner 66 has a heater wall 78 which is exposed to the fluid jacket chamber 72 and extends in spaced and opposite relation to the common wall 62 so that the common wall 62 is exposed to heat radiated from the heater wall 78. The heater wall 78 may be formed with an opening 80 to permit a portion of the gas to contact with the bottom wall 62 to increase heat transfer to the fuel-air mixture in the heat riser 50.

The discharge port 74 is disposed adjacent to the heater wall 78 to direct the hot gas from the reaction chamber 68 toward the heater wall 78. The aperture 76 is positioned in alignment with the outlet port 60 and arranged with respect to the discharge port 74 such that the gas from the reaction chamber 68 covers substantially all outer surface area of the reaction chamber 68 before it flows out of the fluid jacket chamber 72 through the aperture 76.

The plurality of passages 70 extend upwardly from the reaction chamber 68 so that the exhaust gas alters its direction in the reaction chamber 68 (see solid arrows) to lengthen flow path of the exhaust gas till the discharge port 74.

It is to be noted that amount of heat transfer from the exhaust gas toward the casing 22 before the gas reaches the reaction chamber 68 is minimized so that the temperature of the exhaust gas is maintained high enough for oxidation of unburned content as it enters the reaction chamber 68 because the inner liner 64 jacketed by the outer liner 66 prevents the exhaust gas from contacting with the casing 56. It is also to be noted that the residence time of the exhaust gas in the reaction chamber is lengthened due to the arrangement of the plurality of passages 70 and the reduction of temperature is minimized due to the fluid jacket chamber 72.

Additionaly it is to be noted that the hot gas resulted from the oxidation of unburned contents of the exhaust gas in the reaction chamber 68 heats the heater wall 78 and then flows through the fluid jacket chamber 72 surrounding the reaction chamber 68.

It will now be appreciated that the exhaust gas is maintained at elevated temperature until complete oxidation of the unburned contents in the reaction chamber 68 and the common wall 78 which forms the bottom of heat riser 50 is heated sufficiently because the gas resulted from the oxidation of the exhaust gas in the reaction chamber 68 is directed toward the heater wall 78.

In the above described embodiment, although the dual-walled port liner 54 is provided in the exhaust port 42, a single-walled port liner may be provided in the exhaust port 42 with an air layer therebetween by casting, if a little increase in amount of heat loss is acceptable.

In the embodiment, although the air injection nozzle 24 is inserted into the exhaust port 42 to inject additional air into the exhaust gas right after the exhaust valves 44, the air injection nozzle may be positioned in any other appropriate location in the exhaust conduit 14.

In the embodiment, although there is no recirculation of the exhaust gas into the auxiliary combustion chamber 6, a slight amount of exhaust gas recirculation into the auxiliary combustion chamber 6 which would not deteriorate ignition of the fuel-air mixture with a spark plug is possible and effective in lowering emissions.

It will be observed from the preceding description that because ignition in the main combustion chamber 4 is initiated by a combustion flame from the auxiliarycombustion chamber 6, maximum EGR rate with acceptable drivability is increased, lowering $NO_x$ emissions to a great extent.

It will also be observed that because the exhaust gas resulted from the combustion of the engine 2 contains relatively large amount of CO and HC which are combustible, mixing of air with the exhaust gas will immediately result in a relatively efficient post combustion in the exhaust conduit 14 even if temperature of exhaust gas is not sufficiently high enough. As a result, a relatively simple thermal insulating installation, such as the port liner 54, the inner and outer liners 64 and 66, can suffice.

What is claimed is:

1. A method for operating a spark ignition internal combustion engine having an auxiliary combustion chamber connected to a main combustion chamber by a torch flame passage and means for igniting a fuel-air mixture in the auxiliary combustion chamber, comprising:

passing a fuel-air mixture into the auxiliary combustion chamber;

passing the fuel-air mixture into the main combustion chamber;

igniting the fuel-air mixture in the auxiliary combustion chamber for igniting the fuel-air mixture in the main combustion chamber; and mixing the exhaust gas resulting from the combustion of the fuel-air mixtures in the auxiliary and main combustion chambers with the fuel-air mixture to be passed into the main combustion chamber.

2. A method for operating a spark ignition internal combustion engine having an auxiliary combustion chamber connected to a main combustion chamber by a torch flame passage and means for igniting a fuel-air mixture in the auxiliary combustion chamber, comprising:

providing a fuel-air mixture, air fuel ratio (A/F ratio) of the fuel-air mixture being from about 12:1 to about 16:1;

passing the fuel-air mixture into the main combustion chamber;

passing the fuel-air mixture into the auxiliary combustion chamber;

igniting the fuel-air mixture in the auxiliary combustion chamber for igniting the fuel-air mixture in the main combustion chamber; and mixing the exhaust gas resulting from the combustion of the fuel-air mixtures in the auxiliary and main combustion chambers with the fuel-air mixture to be passed into the main combustion chamber.

3. A method for operating a spark ignition internal combustion engine having an auxiliary combustion chamber connected to a main combustion chamber by a torch flame passage and means for igniting a fuel-air mixture in the auxiliary combustion chamber, comprising:

providing a fuel-air mixture, air fuel ratio (A/F ratio) of the fuel-air mixture being from about 12:1 to about 16:1;

passing the fuel-air mixture into the main combustion chamber;

passing the fuel-air mixture into the auxiliary combustion chamber;

igniting the fuel-air mixture in the auxiliary combustion chamber for igniting the fuel-air mixture in the main combustion chamber;

mixing the exhaust gas resulting from the combustion of the fuel-air mixtures in the auxiliary and main combustion chambers with the fuel-air mixture to be passed into the main combustion chamber; and mixing an additional air with the exhaust gas resulting from the combustion of the fuel-air mixtures in the auxiliary and main combustion chambers.

4. A method as claimed in claim 1, in which amount of the exhaust gas mixed with the fuel-air mixture to be passed into the main combustion chamber is from about 10 to 25 percent of the sum of amount of the fuel-air mixture to be passed into the main combustion chamber, and the exhaust gas mixed with the fuel-air mixture to be passed into the main combustion chamber.

5. A method as claimed in claim 2, in which amount of the exhaust gas mixed with the fuel-air mixture to be passed into the main combustion chamber is from about 10 to about 25 percent of the sum of amount of the fuel-air mixture to be passed into the main combustion chamber, and the exhaust gas mixed with the fuel-air mixture to be passed into the main combustion chamber.

6. A method as claimed in claim 3, in which the additional air is mixed with the exhaust gas before the exhaust gas is mixed with the fuel-air mixture to be passed into the main combustion chamber.

7. A method as claimed in claim 6, in which amount of the exhaust gas mixed with the fuel-air mixture to be passed into the main combustion chamber is from about 10 to 25 percent of the sum of amount of the fuel-air mixture to be passed into the main combustion chamber, and the exhaust gas mixed with the fuel-air mixture to be passed into the main combustion chamber.

8. A method for operating a spark ignition internal combustion engine having an auxiliary combustion chamber connected to a main combustion chamber by a torch flame passage and means for igniting a fuel-air mixture in the auxiliary combustion chamber, comprising:

providing a fuel-air mixture, air fuel ratio (A/F ratio) of the fuel-air mixture being from about 12:1 to about 16:1;

passing a first portion, in amount, of the fuel-air mixture into the main combustion chamber;

passing a second portion, in amount, of the fuel-air mixture in to the auxiliary combustion chamber;

igniting the second portion of the fuel-air mixture in the auxiliary combustion chamber for igniting the first portion of the fuel-air mixture in the main combustion chamber; and mixing about 10 to about 25 percent of the exhaust gas resulting from the combustion of the fuel-air mixtures in the auxiliary and main combustion chambers with the first portion of the fuel-air mixture during operation of the engine under low and intermediate loads.

9. A method as claimed in claim 8, further in combination therewith of: mixing an additional air with the exhaust gas before the exhaust gas is mixed with the first portion of the fuel-air mixture.

10. A method as claimed in claim 8, further in combination therewith of: mixing the exhaust gas resulting from the combustion of the fuel-air mixtures in the auxiliary and main combustion chambers with the second portion of the fuel-air mixture.

11. A method as claimed in claim 10, further in combination therewith of: mixing an additional air with the exhaust gas before the exhaust gas is mixed with the first portion of the fuel-air mixture.

12. A combustion system comprising:

a main combustion chamber;

an auxiliary combustion chamber connected to said main combustion chamber by a torch flame passage;

means for discharging a fuel-air mixture;

means for passing a first portion, in amount, of the fuel-air mixture into the main combustion chamber;

means for passing a second portion, in amount, of the fuel-air mixture into the auxiliary combustion chamber;

means for igniting the fuel-air mixture in the auxiliary combustion chamber for igniting the fuel-air mixture in the main combustion chamber;

exhaust means for directing the exhaust gas resulting from combustion to the fuel-air mixtures in the auxiliary and main combustion chambers;

a conduit connected in fluid communication with said exhaust means and said first mentioned passing means;

control means for passing a predetermined percent of the exhaust gas resulting from the combustion of the fuel-air mixtures in the auxiliary and main combustion chambers into the first mentioned passing means during operation of the engine under low and intermediate loads.

13. A combustion system as claimed in claim 12, further in combination therewith of: means for injecting an additional air into the exhaust gas resulting from combustion of the fuel-air mixtures in the auxiliary and main combustion chambers before the exhaust gas is passed into the first mentioned passing means.

14. A combustion system as claimed in claim 12, in which air fuel ratio (A/F ratio) of the fuel-air mixture is from about 12:1 to about 16:1.

15. A combustion system as claimed in claim 12, in which air fuel ratio (A/F ratio) of the fuel-air mixture is from about 12:1 to about 16:1 and the predetermined percent is from about 10 to about 25 percent.

16. A combustion system as claimed in claim 12, in which the providing means is a carburetor which provides a fuel-air mixture air fuel ratio (A/F ratio) of which is from about 12:1 to about 16:1.

17. A combustion system as claimed in claim 12, in which the discharging means is a carburetor which discharges a fuel-air mixture air fuel ratio (A/F ratio) of which is from about 12:1 to about 16:1 and said control means passes about 10 to about 25 percent of the exhaust gas in response to load of the engine under operation of the engine under low and intermediate loads.

18. A combustion system as claimed in claim 17, in which said control means is responsive to the manifold pressure of the main combustion chamber.

19. A combustion system as claimed in claim 17, in which said control means is responsive both to the manifold pressure of the main combustion chamber and the exhaust pressure in the exhaust means.

20. A combustion system comprising:

a plurality of main combustion chambers;

a plurality of auxiliary combustion chambers, corresponding in number to the plurality of main combustion chambers, each being connected to one main combustion chamber by a torch flame passage;

means for discharging a fuel-air mixture;
a heat riser connected to said discharging means to receive the fuel-air mixture;
a plurality of main intake passages, each having one end opening to said heat riser and other end communicating with at least one main combustion chamber to pass a first portion, in amount, of the fuel-air mixture into the main combustion chamber;
a plurality of auxiliary intake passages, each having one end opening to said heat riser and other end communicating with at least one auxiliary combustion chamber to pass a second portion, in amount, of the fuel-air mixture into the auxiliary combustion chamber;
means for igniting the fuel-air mixture in each of the plurality of auxiliary combustion chambers for igniting the fuel-air mixture in the associated one of the plurality of main combustion chambers;
an exhaust manifold comprising:
a casing, said casing having a plurality of inlet ports, each being connected to at least one of the plurality of main combustion chambers to receive the exhaust gas and an outlet port;
an inner liner within said casing, said inner liner having a reaction chamber and a plurality of inlet ports extending outwardly from said reaction chamber toward said inlet ports, respectively, to receive the exhaust gas; and
an outer liner within said casing to jacket said inner liner, said outer liner being spaced from said inner liner to form around said reaction chamber a fluid jacket chamber which is in communication with said reaction chamber and with said outlet port to allow the exhaust gas to flow from said reaction chamber to said outlet port;
a conduit connected in fluid communication with said exhaust manifold and said plurality of main intake passages; and
control means for passing a predetermined percent of the exhaust gas during operation of the engine under low and intermediate loads.

* * * * *